US012793982B2

(12) United States Patent
Choi et al.

(10) Patent No.: US 12,793,982 B2
(45) Date of Patent: Nov. 10, 2026

(54) NEGATIVE ELECTRODE, AND LITHIUM BATTERY INCLUDING SAME

(71) Applicant: Samsung SDI Co., Ltd., Yongin-si (KR)

(72) Inventors: Junghyun Choi, Yongin-si (KR); Seunguk Kwon, Yongin-si (KR); Yeongap Kim, Yongin-si (KR); Kyoseon Koo, Yongin-si (KR); Kijun Kim, Yongin-si (KR); Ho Kim, Yongin-si (KR); Yuuya Arikawa, Yongin-si (KR); Seongho Jeon, Yongin-si (KR); Sungsoo Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 640 days.

(21) Appl. No.: 18/004,005

(22) PCT Filed: Dec. 3, 2021

(86) PCT No.: PCT/KR2021/018288

§ 371 (c)(1),
(2) Date: Jun. 7, 2023

(87) PCT Pub. No.: WO2022/124716

PCT Pub. Date: Jun. 16, 2022

(65) Prior Publication Data

US 2024/0290983 A1 Aug. 29, 2024

(30) Foreign Application Priority Data

Dec. 7, 2020 (KR) ........................ 10-2020-0169836

(51) Int. Cl.

| | |
|---|---|
| ***H01M 6/18*** | (2006.01) |
| ***H01M 4/133*** | (2010.01) |
| ***H01M 4/134*** | (2010.01) |
| ***H01M 4/36*** | (2006.01) |
| ***H01M 4/38*** | (2006.01) |
| ***H01M 4/587*** | (2010.01) |
| ***H01M 4/62*** | (2006.01) |
| ***H01M 10/052*** | (2010.01) |
| ***H01M 10/0565*** | (2010.01) |
| *H01M 4/02* | (2006.01) |

(52) U.S. Cl.

CPC ........... *H01M 4/625* (2013.01); *H01M 4/133* (2013.01); *H01M 4/134* (2013.01); *H01M 4/366* (2013.01); *H01M 4/386* (2013.01); *H01M 4/587* (2013.01); *H01M 4/62* (2013.01); *H01M 10/052* (2013.01); *H01M 10/0565* (2013.01); *H01M 2004/021* (2013.01); *H01M 2004/027* (2013.01); *H01M 2300/0082* (2013.01)

(58) Field of Classification Search

CPC ...... H01M 4/625; H01M 4/133; H01M 4/134; H01M 4/366; H01M 4/386; H01M 4/587; H01M 4/62; H01M 10/052; H01M 10/0565; H01M 2004/021; H01M 2004/027; H01M 2300/0082

See application file for complete search history.

(56) References Cited

U.S. PATENT DOCUMENTS

| | | | | |
|---|---|---|---|---|
| 10,084,189 | B2 * | 9/2018 | Zhang | H01M 10/0525 |
| 10,297,816 | B2 * | 5/2019 | Hong | H01M 4/366 |
| 11,459,242 | B2 * | 10/2022 | Neale | H01M 10/0525 |
| 2010/0136343 | A1 | 6/2010 | Chang et al. | |
| 2014/0295273 | A1 | 10/2014 | Mah et al. | |
| 2018/0013150 | A1 | 1/2018 | Yi | |
| 2018/0062175 | A1 | 3/2018 | Choi | |
| 2019/0058185 | A1 | 2/2019 | Lee et al. | |
| 2019/0305313 | A1 | 10/2019 | Kim et al. | |

FOREIGN PATENT DOCUMENTS

| | | | |
|---|---|---|---|
| CN | 108155350 | A | 6/2018 |
| JP | 10-125336 | A | 5/1998 |
| JP | 6135219 | B2 | 5/2017 |
| KR | 10-0801595 | B1 | 2/2008 |
| KR | 10-2014-0117205 | A | 10/2014 |
| KR | 10-2018-0005854 | A | 1/2018 |
| KR | 10-2018-0020599 | A | 2/2018 |
| KR | 10-2018-0025686 | A | 3/2018 |
| KR | 10-2019-0114680 | A | 10/2019 |

(Continued)

OTHER PUBLICATIONS

Mi, H., et al., "Three-dimensional network structure of silicon-graphene-polyaniline composites as high performance anodes for Lithium-ion batteries," Electrochimica Acta, 2016, Elsevier, pp. 1032-1040.

Tonga, M., et al., "Enhanved thermoelectric properties of PEDOT:PSS composites by functionalized single wall carbon nanotubes," International Journal of Energy Research, 2020, Wiley, pp. 9149-9156.

EPO Extended European Search Report dated Nov. 21, 2024, issued in corresponding European Patent Application No. 21903762.9, 10 pages.

Korean Office Action corresponding to KR Application No. 10-2020-0169836, dated Jul. 19, 2025 (9 pages).

(Continued)

*Primary Examiner* — Raymond Alejandro

(74) *Attorney, Agent, or Firm* — Womble Bond Dickinson (US) LLP

(57) ABSTRACT

Provided are a negative electrode and a lithium battery including the same, the negative electrode including: a negative electrode current collector; and a negative electrode active material layer arranged on the negative electrode current collector. The negative electrode active material layer comprises a negative electrode active material and a composite conductive material, wherein the composite conductive material comprises a core and a coating layer, the core comprises a carbon-based conductive material, and the coating layer comprises an ion-conductive polymer.

20 Claims, 1 Drawing Sheet

(56) References Cited

FOREIGN PATENT DOCUMENTS

| | | | |
|---|---|---|---|
| KR | 10-2020-0013933 | A | 2/2020 |
| KR | 10-2020-0018328 | A | 2/2020 |

OTHER PUBLICATIONS

International Search Report dated Mar. 10, 2022, corresponding to PCT/KR2021/018288, 2 pages.

Vu, Minh Canh, et al., "Core-shell structured carbon nanotube-poly(methylmethacrylate) beads as thermo-conductive filler in epoxy composites," Composites Part A, vol. 109, 2018, pp. 55-62.

* cited by examiner

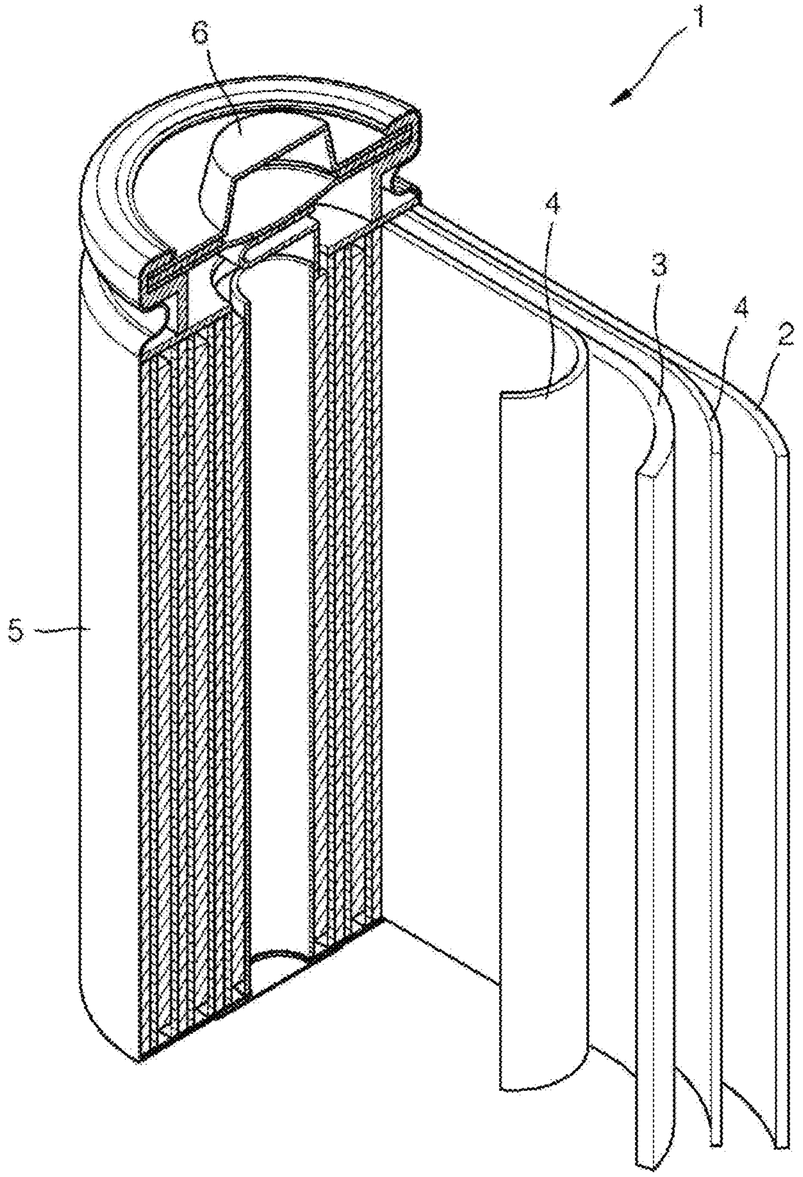
1
6
4
3
4
2
5

NEGATIVE ELECTRODE, AND LITHIUM BATTERY INCLUDING SAME

CROSS-REFERENCE TO RELATED APPLICATIONS

This application is a U.S. National Phase Patent Application of International Application Number PCT/KR2021/018288, filed on Dec. 3, 2021, which claims priority to Korean Patent Application Number 10-2020-0169836, filed on Dec. 7, 2020, the entire content of each of which is incorporated herein by reference.

TECHNICAL FIELD

The present invention relates to a negative electrode and a lithium battery including the same.

BACKGROUND ART

Lithium batteries are used for various purposes due to their high voltage and high energy density. For example, electric vehicles (HEVs, PHEVs, etc.) may use excessive electricity and must be operated for a long time. In order to realize a lithium battery suitable for these uses, a negative electrode active material having increased discharge capacity and excellent lifespan characteristics is required. In this regard, a carbon-based negative electrode active material is porous, has little change in volume during charging and discharging, and is electrochemically stable. Such a carbon-based negative electrode active material has a low unit energy density due to the porous structure of carbon. For example, the theoretical capacity of graphite having high crystallinity is 372 mAh/g in a $LiC_6$ composition. Meanwhile, a metal-based negative electrode active material has higher energy density than the carbon-based negative electrode active material. The metal-based negative electrode active material may be, for example, silicon (Si), tin (Sn), aluminum (Al), or the like. However, such a metal-based negative electrode active material easily deteriorates due to a high volume change during charging and discharging, resulting in poor lifespan characteristics. Accordingly, there is a need for a lithium battery having improved lifespan characteristics by suppressing a volume change during charging and discharging of a metal-based negative electrode active material and deterioration due to the volume change.

DESCRIPTION OF EMBODIMENTS

Technical Problem

An aspect provides a negative electrode including a composite conductive material that includes a coating layer including an ion-conductive polymer.

Another aspect provides a lithium battery having improved lifespan characteristics by employing the negative electrode.

Solution to Problem

According to one aspect, a negative electrode includes:

a negative electrode current collector; and a negative electrode active material layer arranged on the positive electrode current collector, wherein the negative electrode active material layer comprises: a negative electrode active material; and a composite conductive material, the composite conductive material comprises a core and a coating layer, and the core includes a carbon-based conductive material, and the coating layer comprises an ion-conductive polymer.

According to another aspect, provided is a lithium battery comprising:

a positive electrolyte; a negative electrode according thereto; and an electrolyte arranged between the positive electrolyte and the negative electrode.

Advantageous Effects of Disclosure

According to one aspect, since a composite conductive material includes a core including a carbon-based conductive material and a coating layer including an ion-conductive polymer, the volume change of the negative electrode including the metal-based negative electrode active material may be suppressed, and consequently, a lithium battery including the negative electrode may have improved energy density and improved lifespan.

BRIEF DESCRIPTION OF DRAWINGS

FIG. 1 is a schematic view of a lithium battery according to an embodiment.

MODE OF DISCLOSURE

The present inventive concept described hereinbelow may have various modifications and various embodiments, example embodiments will be illustrated in the drawings and more fully described in the detailed description. The present inventive concept may, however, should not be construed as limited to the example embodiments set forth herein, and rather, should be understood as covering all modifications, equivalents, or alternatives falling within the scope of the present inventive concept.

The terms used herein is for the purpose of describing particular embodiments only, and is not intended to be limiting the present inventive concept. An expression used in the singular encompasses the expression of the plural, unless it has a clearly different meaning in the context. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. As used herein, "/" may be interpreted as "and", or as "or" depending on the context.

In the drawings, thicknesses may be magnified or exaggerated to clearly illustrate various layers and regions. Like reference numbers may refer to like elements throughout the drawings and the following description. It will be understood that when one element, layer, film, section, sheet, etc. is referred to as being "on" another element, it can be directly on the other element or intervening elements may be present therebetween.

In the present specification, the term "particle diameter" of particles refers to an average diameter of particles when the particles are spherical, and refers to an average major axis length of particles when the particles are non-spherical.

The particle diameter of the particles may be measured by using a particle size analyzer (PSA). The "particle diameter' of the particles refers to, for example, an average particle diameter. The average particle diameter may be, for example, a median particle diameter (D50). The median particle diameter D50 is a particle size corresponding to a 50% cumulative volume calculated from particles having a small particle size in a particle size distribution measured by, for example, a laser diffraction method. For example, D10 is a particle size corresponding to a 10% cumulative volume calculated from particles having a small particle size in a particle size distribution measured by, for example, a laser diffraction method. For example, D90 is a particle size corresponding to a 90% cumulative volume calculated from particles having a small particle size in a particle size distribution measured by, for example, a laser diffraction method.

Hereinafter, a negative electrode according to embodiments and a lithium battery including the same will be described in more detail.

A negative electrode according to an embodiment includes: a negative electrode current collector; and a negative electrode active material layer arranged on the negative electrode current collector, wherein the negative electrode active material layer includes: a negative electrode active material; and a composite conductive material. The composite conductive material includes a core and a coating layer, wherein the core includes a carbon-based conductive material and the coating layer includes an ion-conductive polymer, and the composite conductive material can provide a lithium ion conduction path more effectively. Consequently, the lithium battery including the negative electrode that includes the composite conductive material can prevent deterioration in lifespan caused by expansion and contraction of the negative electrode active material layer.

Lithium ions may move along the ion-conductive polymer included in the coating layer. Consequently, by the ion-conductive polymer included in the coating layer of the composite conductive material, a lithium ion conduction path is effectively provided, and thus the lithium ion conductivity may be improved. In addition, the ion-conductive polymer may enhance a zeta potential (eV) of the surface of the composite conductive material. Consequently, due to the enhanced zeta potential, the dispersibility of the composite conductive material may be improved.

The median particle diameter D50 of the composite conductive material may be, for example, in a range of 0.01 μm to 0.05 μm, 0.015 μm to 0.05 μm, 0.02 μm to 0.05 μm, 0.01 μm to 0.045 μm, 0.01 μm to 0.04 μm, 0.015 μm to 0.045 μm, or 0.02 μm to 0.04 μm. When the median particle diameter D50 of the composite conductive material is within the ranges above, the lithium ion conduction path can be more effectively provided, and thus the lifespan characteristics of the lithium battery including the negative electrode may be further improved. When the median particle diameter D50 of the composite conductive material is excessively low, the lithium ion conduction path may not be effectively provided, and when the median particle diameter D50 of the composite conductive material is excessively high, the dispersibility of the composite conductive material may deteriorate.

A D90-D10 value of the composite conductive material may be, for example, 1.0 μm or less, 0.95 μm or less, 0.9 μm or less, 0.85 μm or less, 0.8 μm or less, or 0.75 μm or less. When the D90-D10 value of the composite conductive material is within the ranges above, the particle size of the composite conductive material may be uniform. Consequently, when the composite conductive material having a uniform size is dispersed in the negative electrode active material layer, the deterioration in lithium ion conductivity caused by detachment of the negative electrode active material layer may be more effectively suppressed. When the D90-D10 value of the composite conductive material is excessively high, the particle uniformity of the composite conductive material may deteriorate, and thus it may be difficult to effectively suppress detachment of the negative electrode active material in a region where the particle size of the composite conductive material is excessively small. The D90-D10 value of the composite conductive material may be, for example, 0.1 μm or more, 0.15 μm or more, 0.2 μm or more, 0.25 μm or more, 0.3 μm or more, or 0.35 μm or more.

The zeta potential of the composite conductive material at a pH 5 or more may be in a range of −10 mV to −200 mV, −20 mV to −200 mV, −30 mV to −200 mV, −40 mV to −200 mV, −50 mV to −200 mV, −62 mV to −200 mV, −10 mV to −180 mV, −10 mV to −160 mV, −10 mV to −140 mV, −10 mV to −120 mV, or −10 mV to −100 mV. More preferably, the zeta potential at pH 5 may be −62 mV to −100 mV, −60 mV to −100 mV, −58 mV to −100 mV, −56 mV to −100 mV, −62 mV to −98 mV, −62 mV to −96 mV, −62 mV to −94 mV, −62 mV to −92 mV, −62 mV to −90 mV, or −56 mV to −90 mV. When the zeta potential of the composite conductive material is within the ranges above, the safety and dispersibility of the composite conductive material may be further improved. Consequently, the composite conductive material is uniformly distributed in the negative electrode active material layer, and thus the lithium ion conduction path may be more effectively provided. The zeta potential may be, for example, measured with a Zetasizer Nano ZS manufactured by Marlvern Panalytica Company.

When the absolute value of the zeta potential of the composite conductive material is excessively low, the composite conductive material aggregates with each other, and thus the composite conductive material may not be uniformly distributed in the negative electrode active material layer. When the absolute value of the zeta potential of the composite conductive material is excessively high, the composite conductive material does not aggregate with each other, and the particle size of the composite conductive material may be rather reduced as being distributed. Consequently, when the particle size of the composite conductive material is reduced, the deterioration in the ion conductivity caused by the detachment of the negative electrode active material may not be effectively suppressed.

The zeta potential of the composite conductive material may be measured from a surface charge value of the composite conductive material. The zeta potential of the composite conductive material may be, for example, measured by measuring the charge of an ion diffusion layer distributed on the interface of the composite conductive material to neutralize the interfacial charge of the ion-conductive polymer included in the coating layer of the composite conductive material. The zeta potential of the composite conductive material may be calculated from differences between the charge at the point where the ion diffusion layer starts and the charge at the point where the ion diffusion layer ends, along the direction of the coating layer from the center of the core.

The core may include a carbon-based conductive material. The core may include, for example, a carbon-based nanostructure. The carbon-based nanostructure may include at least one selected from carbon black, ketjen black, denka black, acetylene black, channel black, furnace black, lamp black, thermal black, fullerene, carbon nanowires, carbon nanofibers, carbon nanosheets, carbon nanobelts, carbon nanotubes, and graphene. When the core includes the carbon-based nanostructure, the conductivity of lithium ions by the composite conductive material may be further improved.

The ion-conductive polymer can improve the conductivity of lithium ions by, for example, swelling into the electrolyte or swelling by the electrolyte when the negative electrode contacts the electrolyte.

The ion-conductive polymer may have, for example, ionic conductivity at 25° C. in a range of $1\times10^{-7}$ S/cm to $1\lambda10^{-1}$ S/cm, $1\lambda10^{-6}$ S/cm to $1\lambda10^{-1}$ S/cm, $1\lambda10^{-5}$ S/cm to $1\times10^{-1}$ S/cm, or $1\lambda10^{-4}$ S/cm to $1\lambda10^{-1}$ S/cm.

When the ion conductivity of the ion-conductive polymer is within the ranges above, a conduction path for lithium ions that can sufficiently supply lithium required for driving the battery and a conduction path for charges that can sufficiently supply electrons: can be simultaneously provided to the negative electrode by the composite conductive material including the carbon-based conductive material in the core and the ion-conductive polymer in the coating layer. Accordingly, by the negative electrode simultaneously providing the conduction path for lithium ions and the conduction path for charges at the same time, the cycle characteristics of the lithium battery may be improved.

The ion-conductive polymer may include, for example, one selected from polystyrene sulfonate (PSS), a polyvinylidene fluoride-hexafluoropropylene (PVDF-HFP) copolymer, polyvinyl fluoride (PVF), polyvinylidene fluoride (PVDF), poly(methyl methacrylate) (PMMA), polyethylene oxide (PEO), polyethylene glycol (PEG), polyacrylonitrile (PAN), polytetrafluoroethylene (PTFE), polyethylene dioxythiophene (PEDOT), polypyrrole (PPY), polyacrylonitrile (PAN), polyaniline, and polyacetylene, or a mixture of two or more thereof.

The ionic conductivity of the PVDF-HFP copolymer at 25° C. may be, for example, $1\times10^{-3}$ S/cm or more, the ionic conductivity of the PVF at 25° C. may be, for example, $2\times10^{-4}$ S/cm or more, the ionic conductivity of the PVDF at 25° C. may be, for example, $5.3\times10^{-4}$ S/cm or more, the ionic conductivity of the PMMA at 25° C. may be, for example, $2.1\times10^{-5}$ S/cm or more, and the ionic conductivity of the PEO at 25° C. may be, for example, $4.2\times10^{-5}$ S/cm.

The ion-conductive polymer may include, for example, a polar functional group as a substituent. When the ion-conductive polymer includes a polar functional group, the lithium ion conductivity may be improved.

As the polar functional group of the ion-conductive polymer, at least one of a sulfonate group, a fluorine group, an ether group, and a hydroxyl group may be included. When the ion-conductive polymer includes, as the polar functional group, at least one of a sulfonate group, a fluorine group, an ether group, and a hydroxyl group, the lithium ions may be conducted by way of the polar functional group. Consequently, due to the polar functional group included in the ion-conductive polymer, the negative electrode active material layer may have further improved lithium ion conductivity.

The ion-conductive polymer including the polar functional group may include, for example, Nafion, Aquivion, Flemion, Gore, Aciplex, Morgane ADP, sulfonated poly (ether ether ketone) (SPEEK), sulfonated poly(arylene ether ketone sulfone) (SPAEKKS), sulfonated poly(aryl ether ketone ketone) (SPAEK), poly[bis(benzimidazobenzisoquinolinones)], (SPBIBI), poly(styrene sulfonate) (PSS), lithium 9,10-diphenylanthracene-2-sulfonate ($DPASLi^+$), and the like.

The polar functional group may further include, for example, at least one selected from an alkoxy group, an amine group, an ester group, a carbonate group, a carbonyl group, a keto group, an epoxy group, an alkylthio group, a sulfonyl group, and a phosphate group.

The ion-conductive polymer may include a polymer represented by one of Formulae 1 to 3:

Formula 1

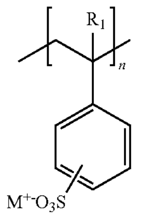

wherein, in the formula above, $R_1$ may be one selected from the group consisting of hydrogen, a substituted or unsubstituted C1-C40 alkyl group, and a substituted or unsubstituted C6-C40 aryl group, n may be an integer of 2 or more, and $M^+$ may be $H^+$ or an alkali metal cation.

The alkali metal cation may be, for example, $Na^+$, $K^+$, or $Li^+$. The sulfonate group may be, for example, bonded at an ortho, metal, or para position. The sulfonate group may be, for example, bonded to a para position.

Formula 2

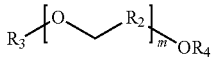

wherein, in the formula above, $R_2$ may be a C1-C6 alkylene group, $R_3$ and $R_4$ may each be a hydrogen atom or a C1-C6 alkyl group, and m may be an integer of 2 or more.

Formula 3

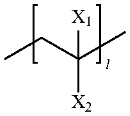

wherein, in the formula above, $X_1$ and $X_2$ may each be a hydrogen atom or a fluoro atom, at least one of $X_1$ and $X_2$ may be a fluoro atom, and I may be an integer of 2 or more.

The ion-conductive polymer may be a polymerization product of a monomer represented by one of Formulae 4 to 6:

Formula 4

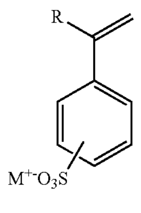

wherein, in the formulae above, R may be one selected from the group consisting of hydrogen, a substituted or unsubstituted C1-C40 alkyl group, and a substituted or unsubstituted C6-C40 aryl group, and $M^+$ may be $H^+$ or an alkali metal cation.

The alkali metal cation may be, for example, $Na^+$, $K^+$, or $Li^+$. The sulfonate group may be, for example, bonded at an ortho, metal, or para position. The sulfonate group may be, for example, bonded to a para position.

Formula 5

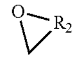

wherein, in the formula above, $R_2$ may be a C1-C6 alkylene group.

Formula 6

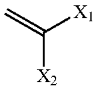

wherein, in the formula above, $X_1$ and $X_2$ may each be a hydrogen atom or a fluoro atom, and at least one of $X_1$ and $X_2$ may be a fluoro atom.

In the all repeating units included in the ion-conductive polymer, for example, an amount of the monomer represented by Formula 2 may be, for example, 60 mol % or more, 65 mol % or more, 70 mol % or more, 75 mol % or more, 80 mol % or more, 85 mol % or more, 90 mol % or more, or 95 mol % or more. In the all repeating units included in the ion-conductive polymer, for example, an amount of the monomer represented by Formula 2 may be, for example, 60 mol % to 100 mol %, 65 mol % to 100 mol %, 70 mol % to 100 mol %, 75 mol % to 100 mol %, 80 mol % to 100 mol %, 85 mol % to 100 mol %, 90 mol % to 100 mol %, or 95 mol % to 100 mol %. When the amount of the monomer represented by Formula 2 in the all repeating units included in the ion-conductive polymer is within the ranges above, the conductivity of lithium ions of the negative electrode may be further improved by the sulfonate group included in the monomer represented by Formula 2. In addition, the coating layer included in the composite conductive material may be more easily formed, and thus a phenomenon in which the coating layer is detached from the core can be more easily suppressed. The ion-conductive polymer may be, for example, polymerized only with the monomer represented by Formula 2.

The amount of the ion-conductive polymer included in the composite conductive material may be, for example, 5 parts by weight to 300 parts by weight based on 100 parts by weight of the core. When the amount of the ion-conductive polymer included in the composite conductive material is within the range above, the conductivity of lithium ions and the dispersibility of the composite conductive material may be further improved. When the amount of the ion-conductive polymer included in the composite conductive material is excessively increased, the ratio of the negative electrode active material may be relatively decreased, and thus the electric density of the negative electrode may be also lowered. When the amount of the ion-conductive polymer included in the composite conductive material is excessively small, the effect of improving the conductivity of lithium ions by the composite conductive material may be insignificant.

The weight average molecular weight of the ion-conductive polymer may be 500 Daltons to 2,000,000 Daltons. The weight average molecular weight of the ion-conductive polymer may be 1,000 Daltons to 2,000,000 Daltons. The weight average molecular weight of the ion-conductive polymer may be 10,000 Daltons to 2,000,000 Daltons. The weight average molecular weight of the ion-conductive polymer may be 50,000 Daltons to 2,000,000 Daltons. The weight average molecular weight of the ion-conductive polymer may be 50,000 Daltons to 1,500,000 Daltons. The weight average molecular weight of the ion-conductive polymer may be 1,000 Daltons to 1,500,000 Daltons. The weight average molecular weight of the ion-conductive polymer may be 1,000 Daltons to 100,000 Daltons. The weight average molecular weight of the ion-conductive polymer may be 1,000 Daltons to 90,000 Daltons. The weight average molecular weight of the ion-conductive polymer may be 10,000 Daltons to 90,000 Daltons. The weight average molecular weight of the ion-conductive polymer may be 50,000 Daltons to 90,000 Daltons.

When the weight average molecular weight of the ion-conductive polymer is within the ranges above, the cohesive strength of the ion-conductive polymer may be improved. Consequently, since the ion-conductive polymer includes the coating layer arranged on the core of the composite conductive material, the improved cohesive force of the ion-conductive polymer may lead to effective suppression of the separation of the coating layer arranged on the core from the core.

When the ion-conductive polymer is the monomer represented by Formula 1, the weight average molecular weight of the ion-conductive polymer may be 10,000 Daltons to 100,000 Daltons. When the ion-conductive polymer is the monomer represented by Formula 1, the weight average molecular weight of the ion-conductive polymer may be 20,000 Daltons to 100,000 Daltons. When the ion-conductive polymer is the monomer represented by Formula 1, the weight average molecular weight of the ion-conductive polymer may be 40,000 Daltons to 100,000 Daltons. When the ion-conductive polymer is the monomer represented by Formula 1, the weight average molecular weight of the ion-conductive polymer may be 60,000 Daltons to 100,000 Daltons. When the ion-conductive polymer is the monomer represented by Formula 1, the weight average molecular weight of the ion-conductive polymer may be 10,000 Daltons to 90,000 Daltons. When the ion-conductive polymer is the monomer represented by Formula 1, the weight average molecular weight of the ion-conductive polymer may be 10,000 Daltons to 80,000 Daltons.

When the ion-conductive polymer is the monomer represented by Formula 2, the weight average molecular weight of the ion-conductive polymer may be 500,000 Daltons to 1,500,000 Daltons. When the ion-conductive polymer is the monomer represented by Formula 2, the weight average molecular weight of the ion-conductive polymer may be 700,000 Daltons to 1,500,000 Daltons. When the ion-conductive polymer is the monomer represented by Formula 2, the weight average molecular weight of the ion-conductive polymer may be 900,000 Daltons to 1,500,000 Daltons. When the ion-conductive polymer is the monomer represented by Formula 2, the weight average molecular weight of the ion-conductive polymer may be 500,000 Daltons to 1,300,000 Daltons. When the ion-conductive polymer is the monomer represented by Formula 2, the weight average molecular weight of the ion-conductive polymer may be 500,000 Daltons to 1,100,000 Daltons.

When the ion-conductive polymer is the monomer represented by Formula 3, the weight average molecular weight of the ion-conductive polymer may be 500 Daltons to 1,500 Daltons. When the ion-conductive polymer is the monomer represented by Formula 3, the weight average molecular weight of the ion-conductive polymer may be 700 Daltons to 1,500 Daltons. When the ion-conductive polymer is the monomer represented by Formula 3, the weight average molecular weight of the ion-conductive polymer may be 900 Daltons to 1,500 Daltons. When the ion-conductive polymer is the monomer represented by Formula 3, the weight average molecular weight of the ion-conductive polymer may be 500 Daltons to 1,300 Daltons. When the ion-conductive polymer is the monomer represented by Formula 3, the weight average molecular weight of the ion-conductive polymer may be 500 Daltons to 1,100 Daltons.

The ion-conductive polymer included in the negative electrode active material layer is arranged only in the coating layer, and the negative electrode active material layer may not include the coated ion-conductive polymer in the surface of the negative electrode active material. A surface of the negative electrode active material may be free of the coated ion-conductive polymer. When the ion-conductive polymer is arranged only in the coating layer and the ion-conductive polymer is not coated on the surface of the negative electrode active material, the conductivity of lithium ions of the negative electrode may be further improved.

Meanwhile, when the ion-conductive polymer is not only arranged in the coating layer of the composite conductive material, but also coated on the surface of the negative electrode active material, the coated ion-conductive polymer on the surface of the negative electrode active material hinders the transfer of lithium ions between the electrolyte solution and the active materials, and thus the conductivity of lithium ions may be rather degraded.

The negative electrode active material layer may further include, in addition to the ion-conductive polymer arranged in the coating layer, a residual ion-conductive polymer dispersed in the negative electrode active material layer. The residual ion-conductive polymer may be an ion-conductive polymer dispersed in the negative electrode active material layer after some of the ion-conductive polymer arranged in the coating layer are separated from the coating layer, or may be an ion-conductive polymer separately added to the negative electrode active material layer. The residual ion-conductive polymer may not be, for example, coated on the surface of the negative electrode active material. When the negative electrode active material layer further includes the residual ion-conductive polymer, the residual ion-conductive polymer serves as an artificial solid electrolyte interphase (SEI) on the surface of the negative electrode, and thus the stability of the negative electrode may be further improved. Consequently, as the stability of the negative electrode is improved, the cycle characteristics of the secondary battery including the negative electrode may be further improved.

The negative electrode active material may include a metal-based negative electrode active material. The metal-based negative electrode active material may be, for example, a silicon-based compound and/or a composite of a silicon-based compound and a carbon-based compound. The metal-based negative electrode active material may be, for example, silicon oxide ($SiO_x$, $0<x<2$). The composite of the silicon-based compound and the carbon-based compound may be, for example, a silicon-carbon nanoparticle (SCN). The average particle diameter of the composite of the silicon-based compound and the carbon-based compound may be 5 μm to 20 μm, and the average particle diameter of the silicon nanoparticle may be 200 nm or less, for example, 10 nm to 200 nm. When the metal-based negative electrode active material includes the silicon-based compound and/or the composite of the silicon-based compound and the carbon-based compound, the improved energy density of the lithium battery including the negative electrode may be provided without deterioration in the cycle characteristics.

In addition, the metal-based negative electrode active material included in the negative electrode active material may include, for example, at least one selected from the group consisting of a lithium metal, a metal alloyable with lithium, a transition metal oxide, and a non-transition metal oxide.

Examples of the metal alloyable with lithium include tin (Sn), aluminum (Al), germanium (Ge), lead (Pb), bismuth (Bi), antimony (Sb), a Si—Y' alloy (where Y' is an alkali metal, an alkaline earth metal, a Group 13 element, a Group 14 element, a transition metal, a rare earth element, or a combination thereof, and Y is not Si), a Sn—Y' alloy (where Y' is an alkali metal, an alkaline earth-metal, a Group 13 element, a Group 14 element, a transition metal, a rare earth element, or a combination thereof, and Y is not Sn), and the like. The element Y' may be, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. The transition metal oxide may include, for example, a lithium titanium oxide, a vanadium oxide, a lithium vanadium oxide, and the like. The non-transition metal oxide may be, for example, $SnO_2$ or the like.

The amount of the metal-based negative electrode active material may be, for example, 1 wt % to 10 wt %, 2 wt % to 10 wt %, 3 wt % to 10 wt %, 4 wt % to 10 wt %, or 5 wt % to 10 wt %, based on the total weight of the negative electrode active material layer. When the amount of the metal-based negative electrode active material included in the negative electrode active material layer is within the ranges above, further improved discharge capacity and lifespan characteristics may be provided.

The negative electrode active material may additionally include a carbon-based negative electrode active material. The carbon-based negative electrode active material may include, for example, crystalline carbon, amorphous carbon, or a mixture thereof. The crystalline carbon may be natural graphite or artificial graphite. The crystalline carbon may be, for example, shapeless or have a plate, flake, spherical, or fibric form. The amorphous carbon may be, for example, soft carbon (carbon sintered at a low temperature) or hard carbon, mesophase pitch carbide, sintered coke, and the like.

The amount of the negative electrode active material included in the negative electrode active material layer may be, for example, 80 wt % to 98 wt %, 85 wt % to 98 wt %, 90 wt % to 98 wt %, or 95 wt % to 98 wt %, based on the total weight of the negative electrode active material layer. The negative electrode active material may include, for example, both three metal-based negative electrode active material and the carbon-based negative electrode active material.

The negative electrode active material layer may further include a binder. The binder in the art may include, for example, polyvinylidene fluoride, polyvinylidene chloride, polybenzimidazole, polyimide, polyvinyl acetate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polyaniline, acrylonitrile butadiene styrene, phenol resin, epoxy resin, polyethylene terephthalate, polytetrafluoroethylene, polyphenyl sulfide, polyamide imide, polyetherimide, polyethylene sulfone, polyamide, polyacetal, polyphenyleneoxide, polybutylene terephthalate, ethylene-propylene-dien terpolymer (EPDM), sulfonated EPDM, styrene butadiene rubber (SBR), fluoro rubber, or various copolymers, but is not limited thereto. Any material available as the binder for a negative electrode in the art may be used.

The negative electrode active material layer may additionally include, in addition to the aforementioned mixed conductive material, a conductive material in the art. The conductive material may include, for example, carbon black, ketjen black, acetylene black, ketjen black, carbon fiber, metal powder of copper, nickel, aluminum, silver, or the like, metal fiber, and the like. In addition, as the conductive material, one type or a mixture of one or more types of the conductive material, such as polyphenylene derivative and the like, may be used. The conductive material is not limited thereto, and any material available as the conductive material in the art may be used.

The thickness of the negative electrode current collector may be, for example, 3 μm to 100 μm. A material for the negative electrode current collector is not limited as long as it has high conductivity without causing a chemical change in the lithium battery, and for example, Cu, stainless steel, Al, Ni, Ti, Ag, sintered carbon, or the surface of copper or stainless steel coated with C, Ni, Ti, Ag, or the like may be used. The negative electrode current collector can form fine irregularities on the surface of the current collector to increase the adhesion of the negative electrode active material, and may have various forms such as films, sheets, foils, nets, porous bodies, foams, and non-woven fabrics. The negative electrode current collector may be, particularly, a copper foil.

The thickness of the negative electrode including the negative electrode current collector and the negative electrode active material layer may be, for example, 3 μm to 200 μm, 10 μm to 180 μm, 20 μm to 150 μm, or 30 μmμm to 120 μm.

The negative electrode may be, for example, prepared as follows. For example, a metal-based negative electrode active material, a carbon-based negative electrode active material, a conductive material, an acryl-based binder, and a solvent were mixed to form a negative electrode active material composition. The negative electrode active material composition thus prepared may be directly coated and dried on the negative electrode current collector to form a negative electrode. Alternatively, the negative electrode active material composition may be cast on a separate support, and then, a film separated from the support may be laminated on a metal current collector to form a negative electrode. The solvent used for preparing the negative electrode may be an organic solvent or water. The solvent may be, for example, N-methyl pyrrolidone, acetone, water, and the like, but is not limited thereto. Any material available as the solvent in the art may be used. When an aqueous binder is used, the solvent may be particularly water.

The amounts of the metal-based negative electrode active material, the carbon-based negative electrode active material, the conductive material, the acryl-based binder, and the solvent may be at levels commonly used in lithium batteries. Depending on the use and configuration of the lithium battery, one or more of the conductive material and the solvent may be omitted.

The lithium battery according to another embodiment includes: a positive electrode; the negative electrode; and an electrolyte arranged between the positive electrode and the negative electrode.

The lithium battery employing the aforementioned metal-based negative electrode active material and the acryl-based binder may be provided with improved density and improved cycle characteristics. The shape of the lithium battery is not particularly limited, and the lithium battery may be a lithium ion battery, a lithium ion polymer battery, a lithium sulfur battery, and the like. The lithium battery may include both a lithium primary battery and a lithium secondary battery. Unless otherwise specified in the present specification, the lithium battery refers to a lithium secondary battery.

The lithium battery may be, for example, prepared by the following method, but is not limited to this method. All other methods used in the art may be used.

First, the aforementioned negative electrode is prepared.

Next, a positive electrode is prepared.

For example, a positive electrode active material composition in which a positive electrode active material, a conductive material, a binder, and a solvent are mixed may be prepared. A positive electrode plate may be prepared by directly coating a metal current collector with the positive electrode active material composition. Alternatively, the positive electrode plate may be prepared by casting the positive electrode active material composition on a separate support, and then laminating a film separated from the support on a metal current collector. The positive electrode is not limited to the forms listed above, and may be in a form other than the aforementioned forms.

As the positive electrode active material, any material available as the lithium-containing metal oxide in the art may be used. For example, at least one selected from composite oxides of lithium and a metal selected from Co, Mn, Ni, and a combination thereof may be used, and a specific example thereof may be a compound represented by one of the following formulae: $Li_aA_{1-b}B'_bD_2$ (where $0.90 \leq a \leq 1.8$ and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 \leq \alpha \leq 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cD_\alpha$ (where $0.90 \leq a \leq 1.8$, $0 \leq b \leq 0.5$, $0 \leq c \leq 0.05$, and $0 \leq \alpha \leq 2$); $Li_aNi_{1-b-c}Mn_bB'_cO_{2-\alpha}F_\alpha$ (where $0.90 \leq a \leq 1.8$, $0 \leq b \leq 0.5$, $0 \leq c \leq 0.05$, and $0 \leq \alpha \leq 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 \leq \alpha \leq 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); and $Li_{(3-f)}Fe_2(PO_4)_3$ (where $0 \leq f \leq 2$), In the formulae above, A may be Ni, Co, Mn, or a combination thereof; B' may be Al, Ni, Co, Mn, Cr, Fe, Mg, Sr, V, a rare-earth element, or a combination thereof; D may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof. The positive electrode active material may be, for example, $LiCoO_2$, $LiMn_xO_{2x}$ (where x is 1 or 2), $LiNi_{1-x}Mn_xO_{2x}$ (where $0<x<1$), $LiNi_{t-x-y}Co_xMn_yO_2$ (where $0.5<1-x-y<0.99$, $0\leq x\leq 0.3$, and $0\leq y\leq 0.3$), $LiFePO_4$, or the like.

A material including a coating layer on a surface of a lithium-containing metal oxide may be used as the positive electrode active material, or a lithium-containing metal oxide and a compound including a coating layer on a surface of the lithium-containing metal oxide surface may be mixed for use. Here, the coating layer may include a coating element compound of an oxide of a coating element, a hydroxide, an oxyhydroxide of a coating element, an oxycarbonate of a coating element, or a hydroxycarbonate of a coating element. The coating element compound constituting the coating layer may be amorphous or crystalline. The coating element included in the coating layer may be Mg, Al, Co, K, Na, Ca, Si, Ti, V, Sn, Ge, Ga, B, As, Zr, or a mixture thereof. When forming the coating layer, any coating method may be used as long as the compound can be coated in a method (e.g., spray coating, dipping method, etc.) that does not adversely affect the physical properties of the positive electrode active material by using the aforementioned elements. Such a coating method is well understood by those skilled in the art, and thus a detailed description thereof will be omitted.

Examples of the conductive material include carbon black, graphite fine particle, and the like, but are not limited thereto. Any material available as the conductive material in the art may be used.

Examples of the binder include a vinylidene fluoride/hexafluoropropylene copolymer, PVDF, polyacrylonitrile, polymethyl methacrylate, polytetrafluoroethylene, a mixture thereof, or a styrene butadiene-rubber polymer, and the like, but are not limited thereto. Any material available as the binder in the art may be used.

Examples of the solvent include N-methyl pyrrolidone, acetone, water, and the like, but are not limited thereto Any material available as the solvent in the art may be used.

The amounts of the positive electrode active material, the conductive agent, the binder, and the solvent may be at levels suitable for use in a lithium battery. Depending on the use and configuration of the lithium battery, one or more of the conductive material, the binder, and the solvent may be omitted.

Next, a separator to be inserted between the positive electrode and the negative electrode is prepared.

For use as the separator, any suitable separator commonly used in a lithium battery may be used. A separator having a low resistance to movement of ions in the electrolyte and excellent electrolyte wettability may be used. For example, the separator may be selected from glass fiber, polyester, Teflon, polyethylene, PTFE, and a combination thereof, and may be in any form of a non-woven fabric or a woven fabric. For a lithium-ion battery, a rollable separator including, for example, polyethylene, polypropylene, or the like may be used. A separator having excellent electrolyte wettability may be used in a lithium-ion polymer battery.

The separator is, for example, prepared in the following method.

A polymer resin, a filler, and a solvent are mixed to prepare a separator composition. The separator composition may be, for example, directly coated and dried on an electrode to form a separator. Alternatively, the separator composition may be cast and dried on a support, and then, a separator film separated from the support may be laminated on an electrode to form a separator. The polymer resin used in the preparation of the separator is not particularly limited, and any material available as the binder for an electrode may be used. The polymer resin used in the preparation of the separator may be, for example, a vinylidene fluoride/hexafluoropropylene copolymer, PVDF, polyacrylonitrile, polymethylmethacrylate, or a mixture thereof.

Next, an electrolyte to be arranged between the positive electrode and the negative electrode is prepared.

The electrolyte may be, for example, an organic electrolyte solution. The organic electrolyte solution may be, for example, prepared by dissolving a lithium salt in an organic solvent. For use as the organic solvent, any suitable organic solvent available in the art may be used. Examples of the organic solvent are propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyl tetrahydrofuran, γ-butyrolactone, dioxolan, 4-methyl dioxolan, N, N-dimethyl formamide, dimethyl acetamide, dimethyl sulfoxide, dioxane, 1,2-dimethoxyethane, sulfolane, dichloroethane, chlorobenzene, nitrobenzene, diethylene glycol, dimethyl ether, or a mixture thereof. For use as the lithium salt, any material available in the art as a lithium salt may be used. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(CyF_{2y+1}SO_2)$ (where x and y may each be a natural number of 1 to 20), LiCl, LiI, or a mixture thereof.

The electrolyte may be, for example, a solid electrolyte. The solid electrolyte may be, for example, a polymer solid electrolyte. The polymer solid electrolyte may be, for example, a polymer including a polyethylene derivative, a polyethylene oxide derivative, a polypropylene oxide derivative, a phosphate ester polymer, a polyester sulfide, polyvinyl alcohol, polyfluorinated vinylidene, or an ionic dissociator. The solid electrolyte may be, for example, an inorganic solid electrolyte. The inorganic solid electrolyte may be, for example, $Li_3N$, LiI, $Li_5NI_2$, $Li_3N$—LiI—LiOH, $LiSiO_4$, $Li_2SiS_3$, $Li_4SiO_4$, $Li_4SiO_4$—LiI—LiOH, $Li_3PO_4$—$Li_2S$—$SiS_2$, and the like. The solid electrolyte may be, for example, an oxide-based solid electrolyte or a sulfide-based solid electrolyte.

Referring to FIG. 1, a lithium battery 1 includes a positive electrode 3, a negative electrode 2, and a separator 4. The positive electrode 3, the negative electrode 2, and the separator 4 may be wound or folded to be accommodated in a battery case 5. Next, the battery case 5 may be filled with an electrolyte, and then sealed with a cap assembly 6, thereby completing the manufacture of the lithium battery 1. The battery case 5 may be, for example, in a cylindrical type, a prismatic type, or a thin-film type. Although not shown in the diagram, the lithium battery 1 may form a battery structure by arranging the separator 4 between the positive electrode 3 and negative electrode 2. After the battery structure is stacked in a bi-cell structure, the resulting bi-cell structure is impregnated with an electrolyte, accommodated in a pouch, and then sealed to complete the manufacture of a lithium polymer battery. In addition, by stacking multiple battery structures, a battery pack may be formed. Such a battery pack may be used in devices requiring high capacity and high output. For example, the battery pack may be, for example, used in a laptop computer, a smart phone, an electronic vehicle, or the like. The lithium battery may be, for example, used in: a power tool operated by an electrical motor; an electric automobile including an electric vehicle (EV), a hybrid electric vehicle (HEV), a plug-in hybrid electric vehicle (PHEV), and the like; an electric two-wheeled vehicle including an electric bicycle (E-bike) and an electric scooter (Escooter); an electric golf cart; a system for power storage, and the like, but is not limited thereto.

In the present specification, substituents are derived by exchanging at least one hydrogen with other atoms or a functional group in an unsubstituted mother group. Unless otherwise stated, when a function group is considered "substituted", the functional group is considered substituted with at least one substitute selected from a C1-C40 alkyl group, a C2-C40 alkenyl group, a C2-C40 alkynyl group, a C3-C40 cycloalkyl group, a C3-C40 cycloalkenyl group, and a C7-C40 aryl group. When a functional group is described as being "selectively substituted", the functional group is considered substituted with the aforementioned substituent.

In the present specification, a and b of the expression "Ca-Cb" refer to the number of carbon atoms of a specific functional group. That is, the functional group may include a to b carbon atoms. For example, the term "C1-C4 alkyl group" refers to an alkyl group having 1 to 4 carbon atoms, and examples thereof are $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, and $(CH_3)_3C$—.

The nomenclature for a particular radical may include mono-radical or di-radical, depending on the context. For example, when a substituent requires two linkages to the rest of the molecule, the substituent should be understood as a diradical. For example, a substituent specified for an alkyl group requiring two linkages includes a diradical, such as —$CH_2$—, —$CH_2CH_2$—, —$CH_2CH(CH_3)CH_2$—, and the like. The nomenclature for other radicals, such as "alkylene" clearly indicate that the radical is a diradical.

In this specification, the term "alkyl group" or "alkylene group" refers to a branched or unbranched aliphatic hydrocarbon group. In an embodiment, the alkyl group may be substituted or unsubstituted. Examples of the alkyl group are a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, a cycloheptyl group, and the like, but embodiments are not limited thereto. Each of these substituents may be selectively substituted or unsubstituted. In an embodiment, the alkyl group may include 1 to 6 carbon atoms. Examples of the C1-C6 alkyl group include methyl, ethyl, propyl, isopropyl, butyl, isobutyl, sec-butyl, pentyl, 3-pentyl, hexyl, and the like, but embodiments are not limited thereto.

In the present specification, the term "aryl group" refers to an aromatic ring in which the ring backbone includes only carbon, a ring system (that is, a fused ring of at least two rings sharing two adjacent carbon atoms), or a ring in which a plurality of aromatic rings are connected to each other via a single bond, —O—, —S—, —C(=O)—, —$S(=O)_2$—, —$Si(R_a)(Rb)$— (where Ra and Rb are each independently a C1-C10 alkyl group), a C1-C10 alkylene group unsubstituted or substituted with halogen, or —C(=O)—NH. When the aryl group is a ring system, each ring in the system is aromatic. For example, the aryl group may be a phenyl group, a biphenyl group, a naphthyl group, a phenanthrenyl group, a naphthacenyl group, or the like, but embodiments are not limited thereto. The aryl group may be substituted or unsubstituted.

In the present specification, the term "aromatic" refers to a ring or a ring system having a conjugated pi electron system, and examples thereof are a carbocyclic aromatic groups (e.g., a phenyl group) and a heterocyclic aromatic group (e.g., pyridine). The term includes a monocyclic or fused polycyclic ring (i.e., a ring that shares adjacent pairs of atoms) as long as the entire ring system is aromatic.

The term "halogen" may include fluorine, bromine, chlorine, iodine, and the like. The term "cyano" refers to —CN. The term "cyanoalkyl" refers to —R—CN, wherein R is an "alkyl".

Exemplary embodiments will be described is in greater details through Examples and Comparative Examples below. However, these examples are provided to represent the technical idea, and the scope of the present technical idea is not limited thereto.

(Preparation of Composite Conductive Material)

Preparation Example 1: CNT:PSS=100:10

0.4 kg of polystyrene sulfonate (PSS) was dissolved in 1.6 kg of distilled water to prepare a polystyrene sulfonate solution. To a solution in which 0.4 kg of carbon nanotube (CNT) was added to 11.6 kg of distilled water and stirred, 0.2 kg of the PSS solution was added and stirred for at least 1 hour to prepare a mixed solution. 6 kg of a CMC solution having a concentration of 1 wt % was added to the mixed solution to prepare a mixed-dispersion solution.

Here, based on 100 parts by weight of the CNT, 10 parts by weight of the PSS was used.

Comparative Preparation Example 1

Carbon nanoparticles were prepared in the same manner as in Preparation Example 1, except that the ion-conductive polymer was not coated on the CNT as in Preparation Example 1.

(Preparation of Negative Electrode and Lithium Battery)

Example 1

(Preparation of Negative Electrode)

7 wt % of a silicon-carbon nanocomposite (SCN, BTR New Energy Technology Co., Ltd.) including carbon-coated silicon particles, 90 wt % of artificial graphite, 0.3 wt % of the composite conductive material prepared in Preparation Example 1, 1.0 wt % of styrene-butadiene rubber (SBR) as a binder, and 1.7 wt % of carboxymethyl cellulose were mixed and added to distilled water. The mixed solution was then stirred for 60 minutes by using a mechanical stirrer to prepare a slurry for a negative electrode active material. The slurry thus prepared was applied to a thickness of about 60 μm on a 10 μm-thick copper current collector by using a doctor blade, dried in a hot-air dryer at 100° C. for 0.5 hour, dried again for 4 hours in a vacuum condition at 120° C., and then roll-pressed to prepare a negative electrode.

(Preparation of Lithium Battery-Coin Half-Cell)

The prepared negative electrode, lithium metal as a counter electrode, and a polyethylene separator (Star® 20) having a thickness of 20 μm as a separator were used. As an electrolyte, a solution in which 1.3 M $LiPF_6$ lithium salt was dissolved after 2 wt % of fluoroethylene carbonate (FEC) and 1.5 wt % of vinylene carbonate (VC) were added to a mixture of ethylene carbonate (EC), dimethyl carbonate (DMC), and ethyl methyl carbonate (EMC) (volume ratio of EC:DMC:EMC=20:40:40) was used, to prepare a lithium battery (coin half-cell).

Examples 2 to 5

A negative electrode and a lithium battery were prepared in the same manner as in Example 1, except that the composite conductive materials prepared in Preparation Examples 2 to 5 were respectively used.

Comparative Example 1

A negative electrode and a lithium battery were prepared in the same manner as in Example 1, except that the conductive material prepared in Comparative Preparation Example 1 was used.

Comparative Example 2

A negative electrode and a lithium battery were prepared in the same manner as in Example 1, except that a CNT and an ion-conductive polymer that have the same weights as those used in Preparation Example 1 were separately added instead of the composite conductive material prepared in Preparation Example 1.

Evaluation Example 1: Particle Diameter Measurement

For the composite conductive materials prepared in Preparation Example 1 and Comparative Preparation Example 1, D10, D50, and D90 were each measured by using a particle size analyzer (PSA). Results of the measurement are shown in Table 1.

TABLE 1

| | D10 (μm) | D50 (μm) | D90 (μm) | D90 − D10 (μm) |
|---|---|---|---|---|
| Preparation Example 1 | 0.0154 | 0.038 | 0.863 | 0.8476 |
| Comparative Preparation Example 1 | 0.0157 | 0.0521 | 1.04 | 1.0243 |

Evaluation Example 2: Zeta Potential Measurement

For the composite conductive materials prepared in Preparation Example 1 and Comparative Preparation Example 1, zeta potentials at pH 5, 6, and 8 were measured by using a zeta potential measuring device (e.g., Zetasizer Nano ZS, Malvern Panalytical).

Results of the measurement are shown in Table 2.

TABLE 2

| Zeta potential (eV) | pH 5 | pH 7 | pH 8 |
|---|---|---|---|
| Preparation Example 1 | −65 | −70 | −70.5 |
| Comparative Preparation Example 1 | −51 | −59.5 | −60 |

As shown in Table 1, the composite conductive materials of Preparation Examples 1, 6, and 11 had the D90-D10 value reduced to 1.0 μm or less, compared to the composite conductive material of Comparative Preparation Example 1.

Accordingly, the composite conductive materials of Preparation Examples 1, 6, and 11 each coated with the ion-conductive polymer had a narrower distribution in particle size than the conductive material of Comparative Preparation Example 1 not having such a coating, and thus had improved uniformity of the particle distribution.

In addition, as shown in Table 2, the absolute value of the zeta potential of the composite conductive materials of Preparation Examples 1, 6, and 11 is also greater than that of the composite conductive material of Comparative Preparation Example 1, and thus the repulsive force between particles increased, showing improved dispersibility.

Therefore, the composite conductive materials of Preparation Examples 1, 6, and 11 had improved uniformity of the particle distribution and improved dispersibility compared to the conductive material of Comparative Preparation Example 1, and thus can be more uniformly distribution in the slurry for the negative electrode active material, and eventually, can be more uniformly distributed in a negative electrode active material layer.

Therefore, even when a thickness of the electrode increases, the composite conductive material can be uniformly distributed in the electrode active material layer, and a stable ion conduction path can be provided in the electrode active material layer.

Evaluation Example 3: Initial Efficiency and High-Rate Charge/Discharge Characteristics For the lithium batteries (coin half-cells) prepared in Example 1 and Comparative Examples 1 and 2, charging and discharging were performed under the following conditions.

Each of the lithium batteries was charged and discharged at 0.1 C in a formation process to measure charging/discharge capacity in the formation process. Initial efficiency (%) was obtained based on the charge capacity and discharge capacity in the formation process, and some of the results are shown in Table 3. The lithium battery undergoing the charging/discharging in the formation process was charged and discharged once at 0.2 C to obtain discharge capacity at 0.2 C, and results thereof are shown in Table 3 as a standard capacity.

The lithium battery undergoing the charging/discharging in the formation process was charged while varying a current to 0.2 C, 1 C, 2 C, and 3 C, and then discharged at 0.2 C to measure charge capacity for each case.

In Table 3, the ratio of the charge capacity at 3 C to the charge capacity at 0.2 C was shown as 3 C charge rate.

In addition, after the lithium battery undergoing the charging/discharging in the formation process was charged at 0.2 C, the discharge capacity for each case was measured while varying a current to 0.2 C, 1 C, 2 C, and 3 C.

In Table 3, the ratio of the discharge capacity at 2 C to the discharge capacity at 0.2 C was shown as 2 C charge rate.

TABLE 3

| | Discharge capacity at Formation [mAh/g] | Initial efficiency [%] | 3 C charge rate [%] | 2 C discharge rate [%] |
|---|---|---|---|---|
| Example 1 | 420.5 | 90.5 | 98.1 | 96.5 |
| Comparative Example 1 | 420.4 | 90.6 | 96.5 | 94.9 |
| Comparative Example 2 | 420.2 | 90.5 | 97.4 | 95.7 |

As shown in Table 3, the lithium battery of Example 1 showed similar discharge capacity and initial efficiency, but improved high-rate characteristics, compared to the thium battery of Comparative Example 1.

Accordingly, it was confirmed that the lithium battery of Example 1 effectively provided a conduction path for lithium ions by introducing the composite conductive material to the negative electrode.

Evaluation Example 3: Evaluation of Lifespan Characteristics

The lithium batteries (half-coin cells) prepared in Example 1 and Comparative Examples 1 and 2 were each charged with a constant current under conditions of a temperature of 25° C. and a current of 0.2 C rate, until the voltage reached 4.20 V (vs. Li). Subsequently, the lithium batteries were each discharged with a constant current of 0.2 C rate until the voltage reached 2.8 V (vs. Li) (formation step).

The lithium batteries undergoing the formation step were each charged with a constant current under conditions of a temperature of 25° C. and a current of 1.0 C rate, until the voltage reached 4.20 V (vs. Li). Subsequently, the lithium batteries were each discharged at a constant current of 0.5 C rate until the voltage reached 2.8 V (vs. Li) ($1^{st}$ cycle).

Such a charging/discharging cycle was repeated 50 times. In all charge/discharge cycles, a 10-minute stop time was provided after every one charge/discharge cycle.

Some of the charging/discharging test results are shown in Table 4. The capacity retention rate at the 50th cycle is defined by Equation 1:

$$\text{Capacity retention rate (\%)}=(\text{discharge capacity in } 50^{th} \text{ cycle/discharge capacity in } 1^{st} \text{ cycle})\times 100\% \quad \text{Equation 1}$$

TABLE 4

| | Capacity retention rate [%] |
|---|---|
| Example 1 | 90.3 |
| Comparative Example 1 | 86.3 |
| Comparative Example 2 | 88.6 |

As shown in Table 4, the lithium batteries of Example 1 had improved lifespan characteristics compared to the lithium batteries of Comparative Examples 1 and 2.

In addition, the lithium batteries of Examples 1 to 3 had relatively better lifespan characteristics than the lithium batteries of Examples 4 and 5.

The poor lifespan characteristics of the lithium battery of Comparative Example 1 were determined to be due to the low amount of the ion-conductive polymer or the failure to effectively provide the conduction path for lithium ions in the negative electrode by not including the ion-conductive polymer.

The poor lifespan characteristics of the lithium battery of Comparative Example 2 were determined to be due to the failure to effective provide the conduction path for lithium ions in the negative electrode by simply mixing the conductive material in the negative electrode without being coated with the ion-conductive polymer.

EXPLANATION OF REFERENCE NUMERALS

| | |
|---|---|
| 1: Lithium battery | 2: Negative electrode |
| 3: Positive electrode | 4: Separator |
| 5: Battery case | 6: Cap assembly |

The invention claimed is:

1. A negative electrode comprising:
a negative electrode current collector; and
a negative electrode active material layer arranged on the negative electrode current collector,
wherein the negative electrode active material layer comprises: a negative electrode active material; and a composite conductive material,
the composite conductive material comprises a core and a coating layer,
the core comprises a carbon-based conductive material, and
the coating layer comprises an ion-conductive polymer.

2. The negative electrode of claim 1, wherein the amount of the ion conductive material included in the composite conductive material is 10 parts by weight to 300 parts by weight, based on 100 parts by weight of the core.

3. The negative electrode of claim 1, wherein the composite conductive material has a median particle diameter D50 of 0.01 μm to 0.05 μm.

4. The negative electrode of claim 1, wherein the composite conductive material has a D90-D10 value of 1.0 μm or less.

5. The negative electrode of claim 1, wherein the composite conductive material has a zeta potential of −10 mV to −200 mV at pH 5 or higher.

6. The negative electrode of claim 1, wherein the ion-conductive polymer comprises at least one selected from polystyrene sulfonate (PSS), a polyvinylidene fluoride-hexafluoropropylene (PVDF-HFP) copolymer, polyvinyl fluoride (PVF), polyvinylidene fluoride (PVDF), poly(methyl methacrylate) (PMMA), polyethylene oxide (PEO), polyethylene glycol (PEG), polyacrylonitrile (PAN), polytetrafluoroethylene (PTFE), polyethylene dioxythiophene (PEDOT), polypyrrole (PPY), polyacrylonitrile (PAN), polyaniline, polyacetylene, and the like.

7. The negative electrode of claim 1, wherein the ion-conductive polymer comprises a polar functional group as a substituent, and
the polar functional group comprises at least one of a sulfonate group, a fluorine group, an ether group, and a hydroxyl group.

8. The negative electrode of claim 1, wherein the ion-conductive polymer comprises at least one of polymers represented by Formulae 1 to 3:

Formula 1

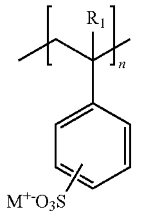

(wherein, in the formulae above, $R_1$ is one selected from the group consisting of hydrogen, a substituted or unsubstituted C1-C40 alkyl group, and a substituted or unsubstituted C6-C40 aryl group, $M^+$ is $H^+$ or an alkali metal cation, and n is an integer of 2 or more)

Formula 2

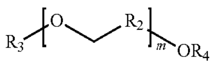

(wherein, in the formula above, $R_2$ is a C1-C6 alkylene group, $R_3$ and $R_4$ are each a hydrogen atom or a C1-C6 alkyl group, and m is an integer of 2 or more); and Formula 3

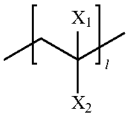

(wherein, in the formula above, $X_1$ and $X_2$ are each a hydrogen atom or a fluoro atom, at least one of $X_1$ and $X_2$ is a fluoro atom, and I is an integer of 2 or more).

9. The negative electrode of claim 1, wherein the ion-conductive polymer comprises at least one of polymers represented by Formulae 4 to 6:

Formula 4

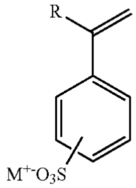

(wherein, in the formulae above, R is one selected from the group consisting of hydrogen, a substituted or unsubstituted C1-C40 alkyl group, and a substituted or unsubstituted C6-C40 aryl group, and $M^+$ is $H^+$ or an alkali metal cation)

Formula 5

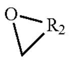

(wherein, in the formula above, $R_2$ is a C1-C6 alkylene group); and

Formula 6

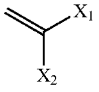

(wherein, in the formula above, $X_1$ and $X_2$ are each a hydrogen atom or a fluoro atom, and at least one of $X_1$ and $X_2$ is a fluoro atom).

10. The negative electrode of claim 1, wherein the ion-conductive polymer has a weight average molecular weight in a range of 500 Daltons to 2,000,000 Daltons.

11. The negative electrode of claim 1, wherein the ion-conductive polymer is arranged only in the coating layer, and a surface of the negative electrode active material is free of the coated ion-conductive polymer.

12. The negative electrode of claim 11, further comprising a residual ion-conductive polymer dispersed in the negative electrode active material layer.

13. The negative electrode of claim 1, wherein the carbon-based conductive material comprises a carbon-based nano-structure.

14. The negative electrode of claim 13, wherein the carbon-based conductive material comprises at least one selected from carbon black, ketjen black, denka black, acetylene black, channel black, furnace black, lamp black, thermal black, fullerene, carbon nanowires, carbon nanofibers, carbon nanosheets, carbon nanobelts, carbon nanotubes, and graphene.

15. The negative electrode of claim 1, wherein the negative electrode active material comprises a metal-based negative electrode active material.

16. The negative electrode of claim 15, wherein the metal-based negative electrode active material comprises at least one selected from a silicon-based compound and a composite of a silicon-based compound and a carbon-based compound.

17. The negative electrode of claim 1, wherein the negative electrode active material layer further comprises a binder.

18. The negative electrode of claim 17, wherein the binder comprises at least one selected from polyvinylidene fluoride, polyvinylidene chloride, polybenzimidazole, polyimide, polyvinyl acetate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polyaniline, acrylonitrile butadiene styrene, phenol resin, epoxy resin, polyethylene terephthalate, polytetrafluoroethylene, polyphenyl sulfide, polyamide imide, polyetherimide, polyethylene sulfone, polyamide, polyacetal, polyphenyleneoxide, polybutylene terephthalate, ethylene-propylene-dien terpolymer (EPDM), sulfonated EPDM, styrene butadiene rubber (SBR), and fluoro rubber.

19. The negative electrode of claim 1, wherein the negative electrode active material layer further comprises a conductive material other than the composite conductive material.

20. A lithium battery comprising:
a positive electrode;
the negative electrode according to claim 1; and
an electrolyte disposed between the positive electrolyte and the negative electrode.

* * * * *